April 16, 1935.  O. H. TRUMAN  1,998,345
GRAVITY METER WITH COMPENSATOR
Filed June 11, 1931  2 Sheets-Sheet 1

FIG.—1

Orley H. Truman Inventor

By W. E. Currie Attorney

April 16, 1935.  O. H. TRUMAN  1,998,345
GRAVITY METER WITH COMPENSATOR
Filed June 11, 1931  2 Sheets-Sheet 2

Orley H. Truman, Inventor
By W. E. Currie, Attorney

Patented Apr. 16, 1935

1,998,345

UNITED STATES PATENT OFFICE 1,998,345

GRAVITY METER WITH COMPENSATOR

Orley H. Truman, Houston, Tex., assignor to Standard Oil Development Company, a corporation of Delaware Application June 11, 1931, Serial No. 543,571

8 Claims. (Cl. 265—1)

This invention relates to improvements in gravity meters of the class in which the force of gravity is balanced by a spring or springs and the increase or decrease of the deflection of the spring provides a measure of the force of gravity.

It is desirable in gravity meters of this class to compensate effectively for the variations in deflection of the springs due to variations in the temperature of the air surrounding the springs.

It is an object of this invention to compensate with the required degree of accuracy for practical use for variations in the deflection of the springs due to changes in temperature.

Other objects will be apparent from the specification and from the accompanying drawings in which latter—

Figure 1:
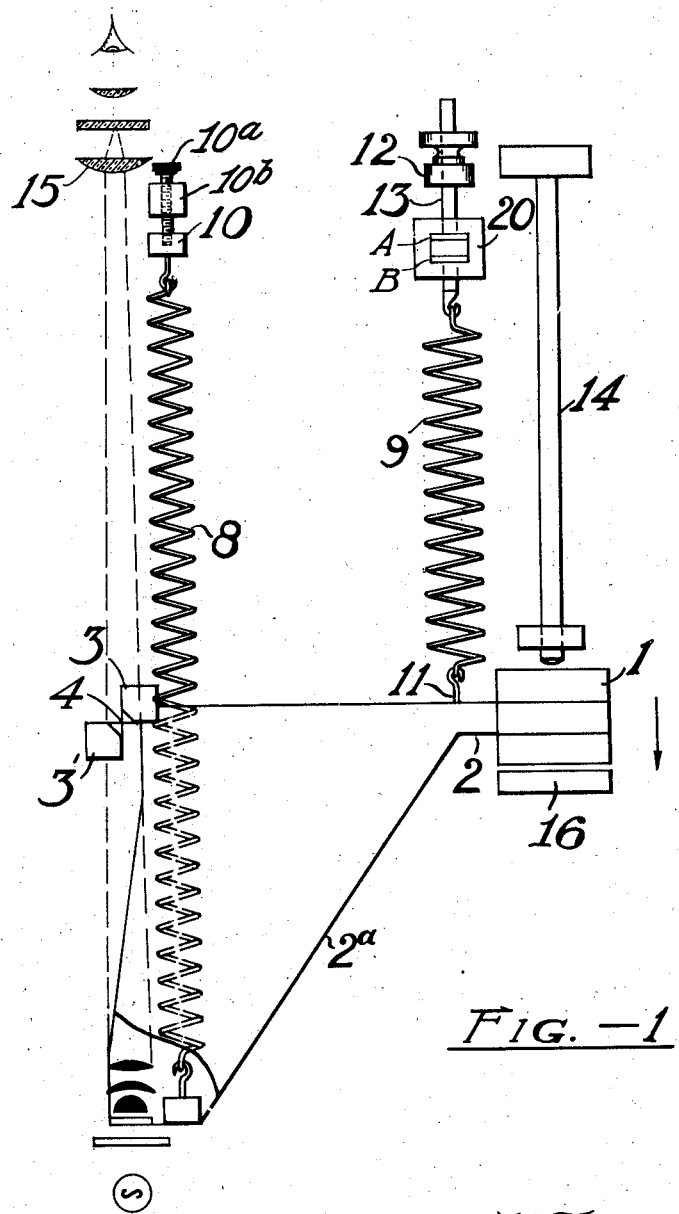
Fig. 1 is a general diagrammatic view of a gravity meter with this improvement in place.

Referring particularly to Fig. 1, the figure represents diagrammatically a gravity meter such as is described in my copending application Serial No. 381,992, filed July 29, 1929, and to which means are applied for compensating for variations in deflection of the springs due to temperature changes. In the figure, reference numeral 1 designates a mass in the form of a block which is attached to a beam or arm 2. The beam or arm forms part of or is rigidly mounted on a body 2a which is pivotally supported on a crossed spring suspension 3, 3' so as to be free to turn through a small angle about an axis 4 perpendicular to the plane of the paper but to be restrained from any other movement. The mass 1 is restrained by helical springs 8 and 9 from downward movement by the force of gravity. Spring 8 is attached to a beam 2 at a point which is considerably below the axis 4. Axis 4 is at the same height as the center of gravity of the entire moving system. At its upper end spring 8 is attached to a block 10 which is adjustable vertically. This adjustment may be made by means of a screw 10a mounted in a support 10b, the lower end of the screw engaging in block 10. Spring 9 is attached to beam 2 at 11 at the position shown and at its upper end spring 9 is attached to a beam 12 through a rod 13 and temperature compensating device in a manner to be later described. The moving system thus described is adjusted to oscillate about a position of stable equilibrium. When the apparatus is not in use the mass 1 is clamped in a non-operative position by means of the structure 14 which is adjusted downwardly to secure the mass 1 against a support 16. Readings of the moving system are taken by means of the structure 15.

The spring 9 is formed of steel or other suitable material and is of such delicate construction that variations in the pull of gravity upon the mass 1 cause increase or decrease in the amount of deflection of the spring. Variations in temperature of the air surrounding the instrument cause variations in the elastic force of the material of the spring as well as changes in dimensions of the elements forming the other parts of the instrument. For example, with a spring formed of steel there is a variation in elastic force of approximately 0.00026 parts per degree C. of temperature change and there is consequently an increase or decrease in the stretch of the spring in an equivalent ratio. It will thus be seen that unless compensation is made for variation in the elastic force of the spring, the temperature must be held within approximately 0.0004 to 0.0003 degrees C. in order to obtain an accuracy of approximately one part in ten million parts. Substantially the same constancy of temperature must be maintained for all other ordinary materials of which the spring can be made, in order to obtain the above mentioned accuracy.

Figure 2:
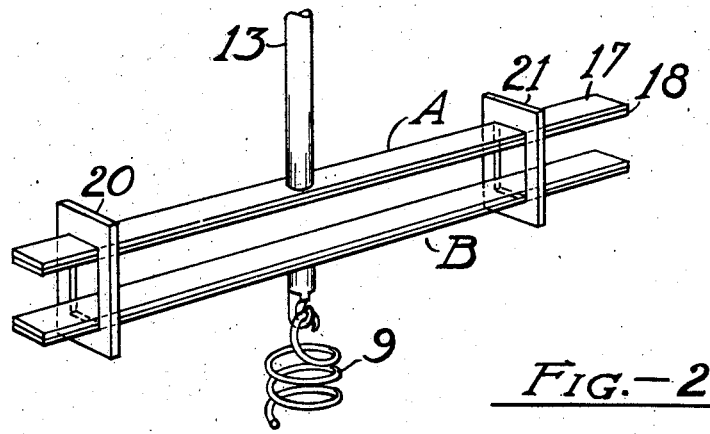
Fig. 2 is a perspective view of one form of the improvement.

An assembly is provided compensating for variation in the elastic force of the material of the spring. Referring again to Figs. 1 and 2, the assembly includes spaced unitary beams or beam units A and B formed of superimposed layers of material 17 and 18 having different co-efficients of expansion. Layers 17 and 18 are secured unyieldingly together by rivets, or by being soldered together, or in any other suitable manner. The inner or adjacent layers 18 of the two beams have a greater co-efficient of expansion than the outer layers 17. The layers 18 can be formed of steel or any other suitable material and the layers 17 can be formed of the alloy known in the trade as "Invar" or the like. Beam A is secured at an intermediate portion of the beam to the rod 13. Beam B supports spring 9 at an intermediate portion of the beam. The beams or beam units are connected at points spaced from their intermediate portions by means of slidable members 20 and 21. The slidable members or sliders are each provided with an opening of sufficient size to receive the beams A and B in spaced relation. The sliders are adjustable longitudinally of the beams. It will be understood that upon elevation of temperature of the air surrounding the spring and assembly, the greater expansion of the relatively more expansible layers 18 of the beams will cause the beams to curve with the relatively less expansible layers 17 constituting the concave surfaces of the beams.

In utilizing the device, the instrument is calibrated by adjusting the sliders longitudinally of the beams to a position such that variations in the length of the spring will be compensated by the curving or straightening of the beams upon variations in temperature of the surrounding air.

The calibrated instrument will subsequently record differences in gravity with only minor variations in the readings due to changes in temperature. For example, a change in gravity of one ten millionth part can be measured by measuring the change of the same amount in the stretch of the spring, irrespective of variations in temperature.

Figure 3:
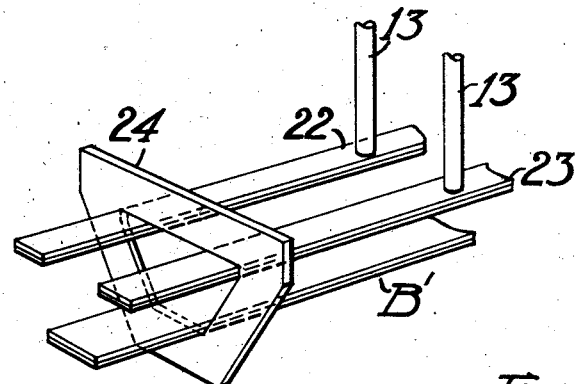
Fig. 3 is a perspective view of a modified form of device for carrying out the invention.

Referring particularly to Fig. 3, a modified form of compensator is shown in which beam unit A comprises two beams 22 and 23 which are off centered vertically with respect to beam B' to such an extent that each beam is sheltered to a minimum amount by the other beams from radiation and convection of heat. The beams are therefore highly responsive to changes in temperature of the surrounding air. The beams are connected by the sliders 24.

By the construction described, a meter of the type which utilizes a weight suspended by a spring is made sufficiently sensitive to accurately measure differences in the intensity of pull of gravity upon the earth's surface while permitting variations in temperature of the air surrounding the spring.

Various changes may be made within the scope of the appended claims in which it is desired to claim all novelty inherent in the invention as broadly as the prior art permits.

I claim:

1. In a gravity meter, a mass, a coil spring supporting the mass whereby the force of gravity is measured by the expansion of the spring, means for observing the expansion, the spring having a given coefficient of expansion, spaced unitary beams formed of superimposed layers of material having different co-efficients of expansion, the adjoining layers of the two beams having the greater co-efficient of expansion, one of the beams supporting the spring at an intermediate portion of the beam, the second beam being supported at an intermediate portion and slidable members connecting the beams spaced from their intermediate portions whereby expansion or contraction of the spring due to changes in temperature is compensated.

2. In a gravity meter, a mass, a coil spring supporting the mass whereby the force of gravity is measured by the expansion of the spring, means for observing the expansion, the spring having a given coefficient of expansion, spaced unitary beams formed of superimposed layers of material having different coefficients of expansion, the adjacent layers of the spaced beams having the greater coefficient of expansion, one of the beams supporting the spring at an intermediate portion of the beam, the other beams being off-centered vertically with respect to the last mentioned beam and being supported at an intermediate portion, and slidable members connecting the beams spaced from their intermediate portions whereby expansion or contraction of the spring due to changes in temperature is compensated.

3. In a measuring device, a mass, a coil spring supporting the mass, spaced unitary beams formed of superimposed layers of material having different coefficients of expansion, the adjoining layers of the beams having the greater coefficient of expansion, one of the beams supporting the spring at an intermediate portion of the beam, the other beams being supported at an intermediate portion, and members connecting the beams spaced from their intermediate portions whereby expansion or contraction of the spring due to changes in temperature is compensated.

4. In a measuring device, a mass, a coil spring supporting the mass, spaced unitary beams formed of superimposed layers of material having different coefficients of expansion, the adjoining layers of the two beams having the greater coefficients of expansion, one of the beams supporting the spring at an intermediate portion of the beam, the second beam being supported at an intermediate portion, and members connecting the beams spaced from their intermediate portions whereby expansion or contraction of the spring due to changes in temperature is compensated.

5. In a measuring device, a mass, a coil spring supporting the mass, spaced unitary beams formed of superimposed layers of material having different coefficients of expansion, the adjacent layers of the spaced beams having the greater coefficient of expansion, one of the beams supporting the spring at an intermediate portion of the beam, the other beams being off-centered vertically with respect to the last mentioned beam and being supported at an intermediate portion, and members connecting the beams spaced from their intermediate portions whereby expansion or contraction of the spring due to changes in temperature is compensated.

6. In a measuring device, a mass, a coil spring supporting the mass, vertically spaced unitary beam units each formed of superimposed layers of material having different coefficients of expansion, the adjoining layers of the beam units having the greater coefficients of expansion, one of the beam units supporting the spring at an intermediate portion of the unit, another beam unit being supported at an intermediate portion, and members connecting the units spaced from their intermediate portions whereby expansion or contraction of the spring due to changes in temperature is compensated.

7. In a measuring device, a mass, a coil spring supporting the mass, vertically spaced beam units each formed of superimposed layers of material having different coefficients of expansion, the adjoining layers of the beam units having the greater coefficients of expansion, one of the beam units supporting the spring at an intermediate portion of the unit, another beam unit being supported at an intermediate portion, and slidable members connecting the units spaced from their intermediate portions whereby expansion or contraction of the spring due to changes in temperature is compensated.

8. A gravity measuring device, comprising a weighted arm, a suspension for one end of the arm permitting free pivotal movement of the arm only about a fixed horizontal axis, means for normally balancing the other end of the arm against the force of gravity comprising a helical spring secured to the arm adjacent the free end of the arm and suspending the arm for oscillation about a position of equilibrium, vertically spaced beam units each formed of superimposed layers of material having different coefficients of expansion, the adjoining layers of the beam units having the greater coefficients of expansion, one of the beam units supporting the spring at an intermediate portion of the units, another beam unit being supported at an intermediate portion, and members connecting the units spaced from their intermediate portions whereby expansion or contraction of the spring due to changes in temperature is compensated.

ORLEY H. TRUMAN.